INVENTOR
Walter Hoppe

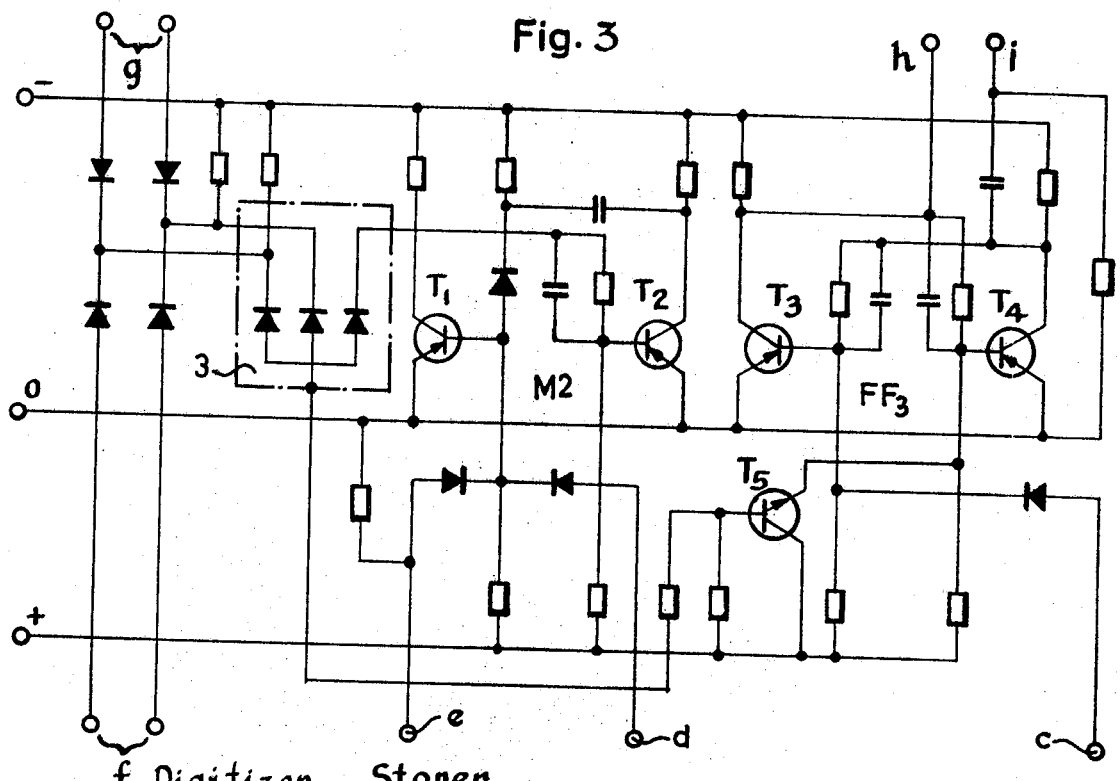
Fig. 3
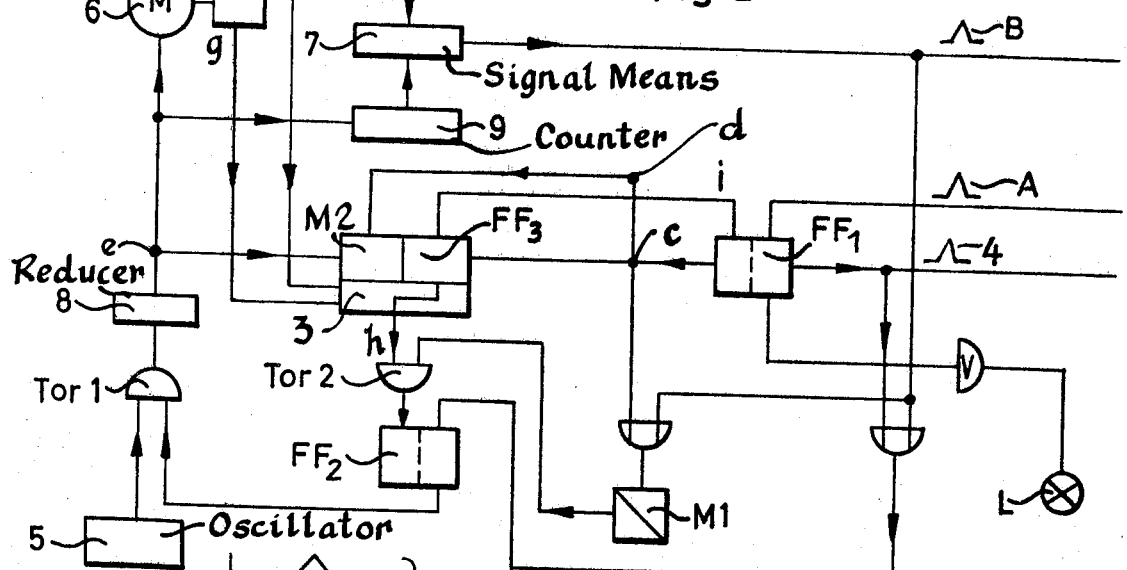
Fig. 2
Fig. 4
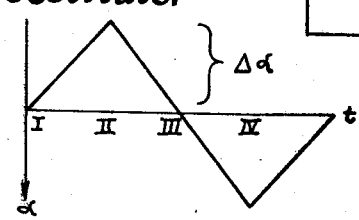
INVENTOR
WALTER HOPPE
BY *[signature]* ATTORNEYS

United States Patent Office 3,513,371
Patented May 19, 1970

3,513,371
DIGITAL CONTROL OF THE POSITIONING OF MECHANISMS, ESPECIALLY OF MOVABLE MEMBERS OF X-RAY DIFFRACTOMETERS
Walter Hoppe, Luisenstrasse 39 I,
8 Munich–2, Germany
Filed May 13, 1965, Ser. No. 455,440
Claims priority, application Germany, May 15, 1964,
H 52,697
Int. Cl. G05b 19/20
U.S. Cl. 318—18       5 Claims

ABSTRACT OF THE DISCLOSURE

A control mechanism employing digital control for both coarse and fine adjustments in which the coarse control is effected by incremental adjustment and the fine control is effected by a step adjustment in response to a code comparison between the represented desired position and the represented actual position.

---

Digital control serves for the direct setting of analogous measuring magnitudes in machine and apparatus parts, as for example, lengths, angles, etc., according to digitally represented numbers. In principle, two systems are known: In the incremental system the magnitude interval to be so set is divided up into a plurality of steps, the number of which are equal to the digital number. There is utilized either a standard drive motor, in which case a photoelectric cell or inductive impulse generator accomplishes the step division, or an impulse motor which is controlled by the number of impulses representing the particular number. It is also possible to combine both principles (impulse motor and impulse generator).

This method is very simple, but relatively subject to error, since there can easily occur a diminution of impulses in the electronic system or the appearance of interference impulses.

The coding or digitizer system likewise can be carried out either with standard motors or impulse motors. In place of the impulse generator, there is substituted a coder, the momentous values of which can be compared with a desired value registered in a storer until agreement exists. This second method is more accurate and more certain in operation, since the numbers are directly compared, but it is, at the same time, more expensive since both the digitizer and the corresponding circuits are expensive.

There has also become known a numerical control of actuating mechanism, especially in machine tools, with the aid of a coarse and a fine measurement, in which the coarse measurement takes place through a digital travel measurement known per se and the fine measurement takes place through a time measurement, in such a way that the intervals of the coarse measurement are interpolated by the time measurement. With the aid of the digital travel measurement a rough positioning is carried out, whereas the fine positioning is executed with the aid of the time measurement, which is effected after a desired value of the coarse measurement, has been achieved.

This control involves the combination of two incremental methods; in the first, travel sections are counted and for the fine setting time sections are counted. The final setting, therefore, does not operate with an absolute comparison of numbers.

In contrast to this, the present invention provides a digital control the final setting of which is based on an absolute numerical comparison.

The invention relates, accordingly, to a digital control of the movement of machine and apparatus parts, particularly the movable members of X-ray diffractometers, utilizing a combination of coarse and fine control. Its characterizing feature lies in the fact that the coarse control takes place with an incremental system known per se, and the fine control takes place with a coding system known per se. It is here important that the construction does not absolutely have to be such that the entire setting takes place without any error. It is possible, for example, to use a simple electric motor with photoelectric cell transmitter which, because of its inertia, will overcontrol. In the subsequent fine adjusting process the final positioning of the motor (slow-speed gearing) is carried out according to the coding principle. If, for example, in the case just mentioned, one is sure that the motor has overrun by a small, but in itself unknown number of steps, then the subsequent coding comparison must take place in reverse. The coder must here be set back by only a small number of steps. It is possible, therefore, for example, where a micrometer screw is involved, to use a coder which has only a drum graduation. Consequently it is possible to get along with one or two place digitizer cells, which because of their low precision are very easy to construct. The advantages of both principles are thus combined. The coarse positioning takes place rapidly according to the inaccurate step system, while the fine positioning is absolute and, accordingly, independent of interference and error impulses.

A number of variations of this control are conceivable. It is possible, for example to employ a synchronously controlled impulse motor which executes the desired number of steps over a preset counter. With appropriate dimensioning of the apparatus the adjustment will almost always be correct, so that the fine setting mechanism does not always have to be operated. The use of a fine digitizer, however, facilitates the control of the exact position and its possible correction in a low gear.

In each setting of a step motor by means of a preselection counting unit a difference may occur between steps traveled and impulses counted. This possibility can only be absolutely checked. The adjusting motor can first be set according to the incremental method by the preselection counting unit. After stopping of the motor the last decimals are absolutely checked by the digitizer. If in such checking a preset storer and the digitizer do not agree, it is then possible to hunt for the correct position within a small interval. The maximum interval is the range checked by the digitizer.

If the correct setting must be sought, this is done as follows: The motor takes one step, and thereupon a testing operation takes place, with such locating step being repeated until the correct position is ascertained.

If it is assumed that the existing difference amounts only to a few impulses, the absolute checking can then be restricted to the last decimals of a setting. If, for example, a step motor is operated with a five-decade preselection counting unit, it then will be sufficient to check the last two decades.

If, for example, a preselection unit with five decades is involved, in which the last two are checked by a digitizer, the following arrangement is possible: Over a photodiode there is counted only each hundredth step. If in the first three decades the desired position is reached, a switchover is then made to the digitizer. Synchronously with each step of the motor a position check is effected. If the digitizer indicates agreement with the storer, the motor is stopped. Since only each hundredth impulse is counted, no special demands are made on the counting mechanism.

The simultaneous adjustment of several travel intervals (coordinates, angles) requires, according to the usual multichannel process, a multiple layout of the necessary electronic control system. According to the invention the same purpose is achieved by a single-channel process as follows: A counter controls synchronously as many impulse motors as the number of parts present to be adjusted. The first adjustment sets all the impulse motors on the smallest desired value. Hereupon, the impulse motor of the smallest desired value is switched off. The next adjustment is made according to the difference between the next smallest and the smallest desired value. Thereupon, the adjusting process is continued until the largest desired value has been set in.

This process can be carried out with the digital control system according to the invention by first carrying out the incremental coarse setting for all the coordinates according to the process just described and, only at the very end, checking and possibly correcting with the fine digitizers the angular values or travel intervals achieved in part in several coarse adjustments.

In the following, the electronic system for the coarse control system is described in detail.

A decadic counter is to stop when it has reached the number preset in an electronic storer. It must be possible to read the number into the storer from a punched strip, and furthermore, it is necessary that this read-in number be preserved in the storer when the motor stops.

The counter may consist of four decadically keyed reduction stages, in which case it is advantageous to utilize as a storer, four bistable multivivrators, whereby it is achieved that the counter and the storer have the same code. Over a single coding matrix the number is read, binary-decadically keyed, into the storer. There is needed in addition only a comparison circuit which gives off a signal when the counter, actuated by the motor impulses, and the storer agree. This circuit must in principle only be able to determine whether two bistable multivibrators have like position. Two flip-flops have the same position when their comparable outputs have the same potential. The circuit therefore checks whether the comparable outputs on the one or the other side fulfill the condition of an AND gate, thereby at its output it is reported by a signal, that the counter and storer agree. The circuit can be further simplified if the condition for like position of the flip-flops is modified, whereby two flip-flops have the same position when non-corresponding or crossed outputs have different potential.

The following description is concerned with the details of the fine control. The digitizer or coder has the function of reporting the position of the step motor, for which purpose a code is used, for example, the binary code. A relay digitizer consists of a disk on which the binary code is plotted in the form of contact rings or strips. When the adjusting motor coupled with the disk is running, the scanning contacts are lifted off, so that no wear can result through friction. Only after stopping of the motor is a relay energized for the checking of the position. The position of the coding disk is compared, with the aid of a comparison circuit, with the stored desired value of the setting.

In an optical digitizer the code is disposed on the drum in the form of holes. For the illumination there suffices, for example, medical microlamps which indicate the combination of the code drum by means of photodiodes.

Checking of the position of the drum is again carried out through a comparison circuit, in which process one decade serves as storer. For this purpose the signal of the photodiode is amplified and a signal inverse thereto is formed.

In the drawings, wherein like reference characters indicate like or corresponding parts:

FIG. 2 is a circuit diagram, primarily in block form, of the fine control system;

FIG. 3 is a detailed circuit diagram of a portion of the circuit illustrated in FIG. 2;

FIG. 4 is a graph illustrating the motor progression involved; and

Figure 1:
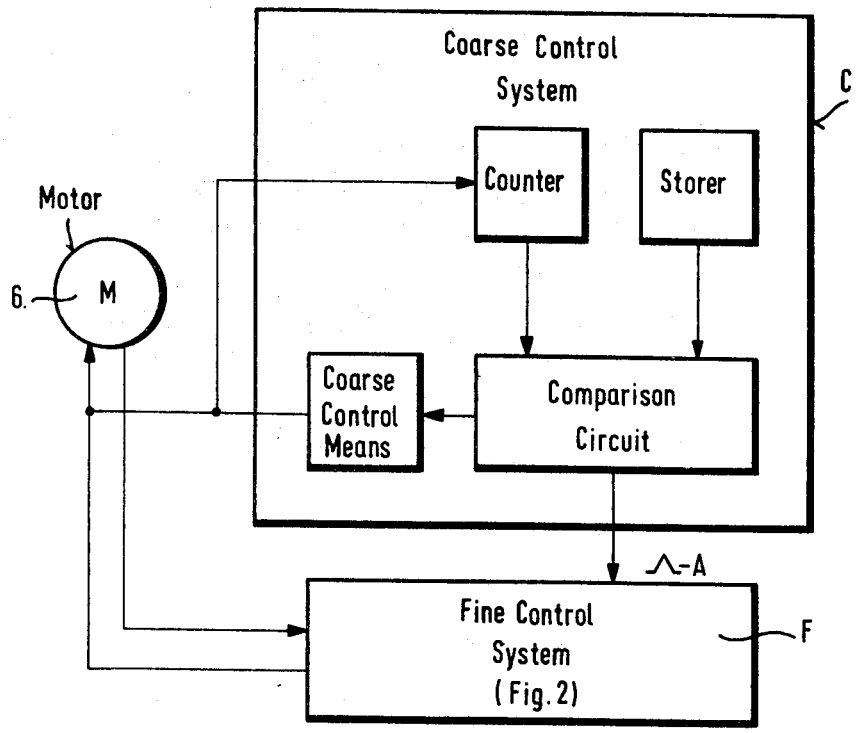
FIG. 1 is a circuit diagram, in block form of a control arrangement according to the invention, employing both a coarse and a fine control system.

Referring to FIG. 1, the motor 6 is adapted to be controlled by both a coarse control system C and a fine control system F.

The coarse control system C may be of conventional construction, known in the art, and for example, as illustrated, may comprise a storer in which the number of steps of the desired position is preset and the value thereof compared in a suitable comparison circuit with the count in a counter actuated by motor impulses. Upon agreement of the numbers present in the storer and in such counter, the motor 6 is stopped and a signal A is transmitted to the fine control system F, illustrated in block form in FIG. 2, and as subsequently described, such fine control system is then actuated to effect the final adjustment, as for example, the last two digits of the number to be set.

Referring to FIG. 2, a releasing impulse A causes a bistable multivibrator $FF_1$ to flip. This switches on illuminating means L of a photoelectric digitizer, energizes multivibrators $M_1$ and $M_2$, and flips over another bistable multivibrator $FF_3$. $FF_3$ opens a gate 2 and is in the position in which it can receive a signal from a test gate 3.

The test gate 3 shows agreement between digitizer and storer when at all inputs of gate 3 the same potential appears. Now, however, upon actuation of the digitizer illuminating means L the monostable multivibrator $M_2$ has been excited. Consequently, a negative potential has been applied to one input of the test gate 3, whereby the gate 3, in correct motor position, can deliver a signal only if $M_2$ is flipped back. This last-mentioned signal flips $FF_3$ and $FF_1$ back into the starting position, and $FF_1$ signals, through an impulse 4, that the position checking has been completed.

If the digitizer (illustrated in FIG. 2) shows another position than that read into the storer, then $FF_1$ and $FF_3$ remain in the position determined by the releasing impulse A.

Thereby, the releasing impulse delayed by the monostable multivibrator $M_1$ (the time constant of $M_1$ being somewhat greater than that of $M_2$) can, through the open gate 2 over $FF_2$, open a gate 1 to an oscillator 5.

With each impulse of oscillator 5 an impulse motor 6 makes one step; simultaneously, $M_2$ is excited and flips back only when the motor 6 again stops. Thereby, $M_2$ initiates a new testing operation after each motor step. The gate 1 to oscillator 5 is closed only when the motor has reached the right position.

In order to scan the range shown in FIG. 3, there is additionally required a program which reverses the motor direction at points II and IV.

The angular range $\Delta\alpha$ is stored. If the motor 6 has scanned in the one direction $\Delta\alpha$, then, by position signaling means 7, the gate 1 is closed and the program is switched by an impulse B to II. Simultaneously, $M_1$ is again energized, which in turn again opens the gate 1 if the position test carried out after the last step was negative.

Between gate 1 and motor 6 there is disposed a suitable reducer 8. The resulting impulses act upon the motor 6, and also upon a decadic counter 9, the content of which is compared over the position signaling means 7 with the content of a decadic storer $\Delta\alpha$.

FIG. 3 illustrates in greater detail the portion of the circuit of FIG. 2 including the bistable multivibrators $M_2$ and FF₃ as well as the test gate 3, and may be directly substituted therein for the corresponding block circuits. FIG. 2 however illustrates line connections by single lines while FIG. 3 illustrates two-conductor connections. Operation of the circuits of FIGS. 2 and 3 is as follows:

Following conclusion of the operation of the coarse control system a releasing impulse A, from the latter, will flip the bistable multivibrator FF₁ and the output signal therefrom will flip the bistable multivibrator FF₃ and at the same time flip the monostable vibrators M₁ and M₂, M₁ having a greater time constant than M₂.

If agreement exists between the position of the motor 6 and the storer, agreement will exist at the corresponding input of the test gate 3 ($g$, $f$). However, the third input of test gate 3 is connected with M₂ and this input will not be in agreement with the other two inputs until M₂ has returned to its original rest condition. In the meantime, the flipping of FF₃ also ($\bar{h}$) will open gate 2 which will thereby remain open until FF₃ has been returned to its original rest condition. Gate 2 thus is opened to receive an impulse from monostable multivibrator M₁ when the latter flips to its original rest condition.

However, as M₂ has a shorter time constant than M₁ upon flipping of M₂ to its rest position an impulse will be transmitted to FF₃, returning the latter to its original rest condition, thereby opening the line $h$ to the gate 2 and returning the latter to a blocking condition. At the same time the return of FF₃ to such rest condition will transmit an impulse over the line $i$ to FF₁ returning it to its original rest condition and transmitting an impulse for indicating that the position checking has been completed.

Assuming that agreement does not exist between the digitizer and the storer, the test gate 3 will not transmit an impulse to FF₃ so that the latter will remain in its flipped condition thereby retaining the gate 2 in open condition. Upon return of M₁ to its original rest position an impulse will be transmitted through the gate 2 to the bistable multivibraotr FF₂ flipping the latter which in turn will open the gate 1 permitting an impulse to pass from the generator 5 to the motor 6. At the same time such stepping impulse will again trigger M₂, repeating the process, it being kept in mind that FF₂ being bistable will hold the gate 1 open. In the event agreement now exists between the digitizer and storer, FF₃ will be restored to its rest condition with the impulse over the line $i$ thereof restoring FF₁ to its original rest condition and the pulse 4 will thereupon return FF₂ to its rest condition. If the position signalling means 7 indicates that an angular range has been completed an impulse B will flip FF₂ to its original rest condition and simultaneously flip M₁.

The circuit of FIG. 2 is directly insertable in the circuit of FIG. 3, replacing gate 3, monostable vibrator M₂ and bistable multivibrator FF₃.

Assuming that FF₁ has been flipped by a release impulse A, an impulse will appear at terminals $c$ and $d$ of FIGS. 2 and 3. In the rest position transistors T₁ and T₃ will be conductive while transistors T₂ and T₄ will be blocked. This condition results from a negative bias on the base of transistor T₃ and a positive bias on the base of the transistor T₄ as a result of the low resistance path formed by the conducting transistor T₃. Upon application of a positive impulse at the terminal $c$ a blocking bias is placed upon the base of transistor T₃ which ceases to be conductive, thereby resulting in the application of a negative bias on the base of the transistor T₄ rendering the latter conductive. At the same time a negative potential appears at the terminal $h$ which is operative to open the gate 2. At the same time, as a result of the positive impulse at the terminal $d$, a positive bias is placed on the base of transistor T₁ blocking the same and thereby resulting in a negative bias on the base of the transistor T₂ rendering the latter conductive.

At the same time a negative potential is applied at the right hand diode of test gate 3. If agreement exists between the output of the digitizer at the terminals $g$ and of the storer at the terminals $f$, zero potential will exist at the other two diodes of test gate 3. However, an impulse will not be transmitted from the AND gate 3 unless agreement exists at all of the diode inputs. Consequently an output signal will be transmitted from the gate 3 when M₂ flips to its original rest condition, in which case transistor T₁ will again be conductive whereby the potential at the third diode is in agreement with those at the other two diodes of the gate 3. An impulse will thus be transmitted to transistor T₅, eliminating the negative bias on the base thereof whereby the latter will become conductive and apply a blocking bias to transistor T₄ thereby returning FF₃ to its original rest condition and simultaneously producing a pulse at the output terminal $i$. As described in connection with FIG. 2, such pulse will restore FF₁ to its rest condition with the previously described results. In the event agreement does not exist at the input $f$ and $g$ M₂ will restore to its original condition with no signal being transmitted by the gate 3 and FF₃ will therefore remain in its flipped condition continuing a potential on the line $h$ and thus continuing to keep the gate 2 open. And at the same time FF₂ will remain in its flipped condition as will FF₁ whereby no output will appear at the latter to reset FF₂. Upon transmission of an impulse from the generator 5 to the motor 6 such impulse will be conducted to M₂ over the terminal $e$ to again flip the latter and reinitiate a test of the digitizer and the storer. If now in agreement the circuit will function as previously described. If not, the last mentioned cycle will be repeated until agreement is reached.

Figure 5:
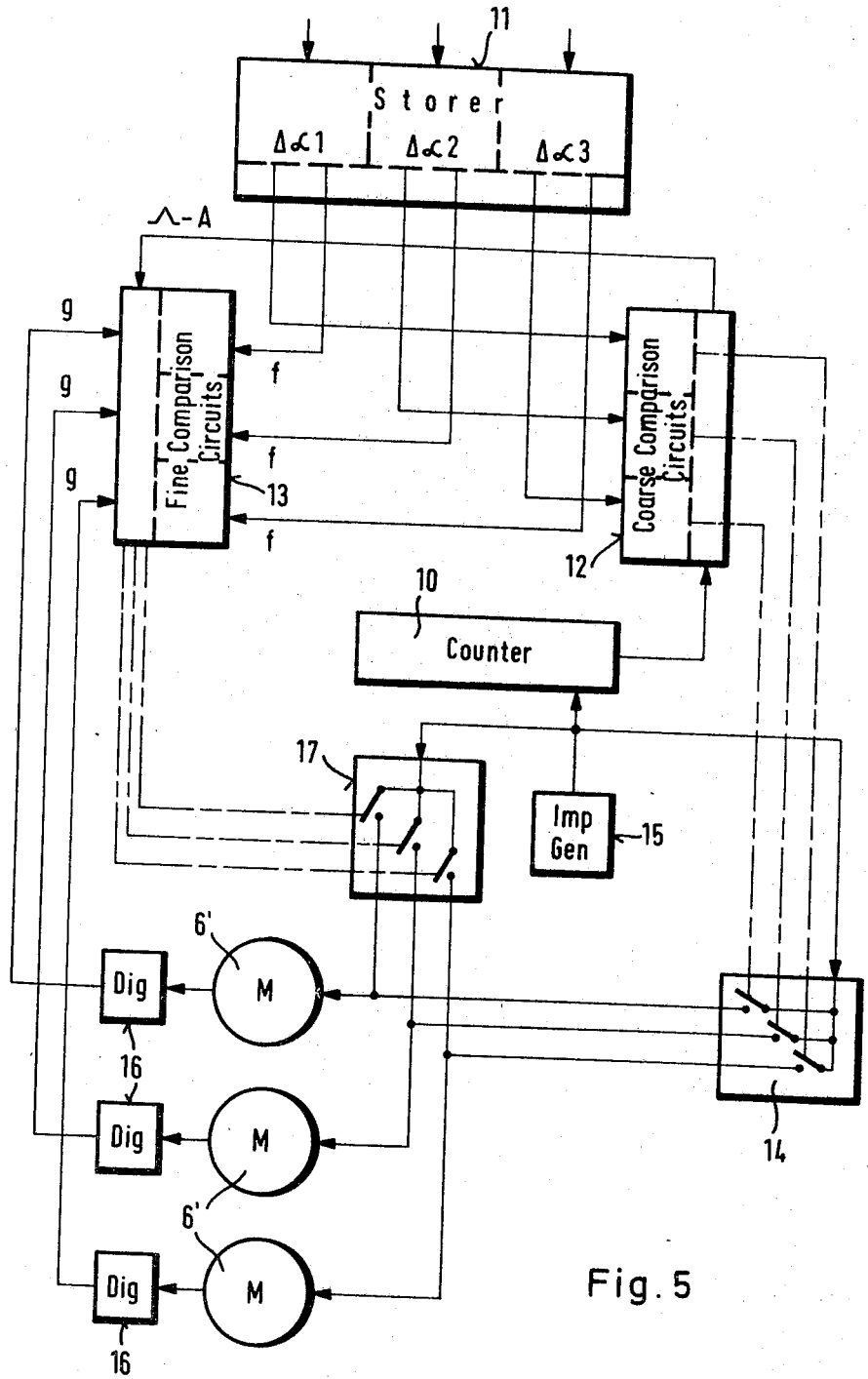
FIG. 5 is a circuit diagram, in block form, illustrating both coarse and fine control systems operative to simultaneously control a plurality of motors utilized in connection with different operative adjustments of a controlled mechanism.

FIG. 5 illustrates the adjustment of several travel intervals (coordinates, angles, etc), in accordance with the invention, by means of a single-channel arrangement in which a counter 10 controls synchronously as many impulse motors 6' as the number of parts present to be adjusted. In this arrangement the storer 11 comprises respective sections $\Delta\alpha 1$, $\Delta\alpha 2$, $\Delta\alpha 3$, for the individual motors 6', which sections store the respective digits of the desired positions, for example, a total of 5 digits with the respective digits representing the coarse adjustment, for example the first three, being operatively conducted to corresponding coarse comparison sections 12 and the respective digits for the fine adjustment, for example the last two, being operatively conducted to the corresponding fine comparison circuit 13, individually illustrated in detail in FIG. 3. The first adjustment under control of the coarse comparison circuits 12 and switches 14 responsive thereto effect the connection of the impulse generator 15 to the impulse motors thereby setting all of the motors on the smallest desired value, a which time the impulse motor of the smallest desired value is switched off by means of the appropriate switch 14. The next adjustment is made according to the difference between the next smallest and the smallest desired value, the adjusting process being continued until the largest desired value has been set. Following completion of the incremental coarse setting for all coordinates according to the process just described, the signal A is transmittted from the coarse control system to the fine control system and checking and possibly correcting of the angular values or travel intervals, achieved in part in several coarse adjustments, is then effected by means of the fine digitizers 16 and circuits controlled thereby, in the manner previously described with respect to the fine control system. The multiple switch 17, under control of the respective fine comparison circuits, operatively connects the impulse generator 15 to the corresponding motors for the individual adjustment thereof as required.

It might be mentioned that FIG. 5 is intended to merely illustrate the application of the present invention to a multiple motor arrangement and while only the storer 11 and impulse generator 15 are illustrated as being common to both coarse and fine control systems, in actual practice, as many as possible of the components of the two systems could be arranged for common operation in both systems.

Publication "Digitale Lagemessung an Arbeitsmaschinen" in ATM (Archiv für technisches Messen and industrielle Messtechnik) a German periodical from Sept. 1963, pp. R 113–R 119 illustrates an apparatus which is suitable for use in effecting a coarse control by means of an incremental operation, and the same publication illustrates also an apparatus which is suitable for use in effecting a fine control by means of a coding operation.

Changes may be made within the scope and spirit of the appended claims which define what is believed to be new and desired to have protected by Letters Patent.

I claim:

1. A digital control mechanism for control of the movement of machine and apparatus parts, particularly movable members of diffractometers, comprising coarse control means for effecting an incremental step advance of such a part, a storer in which is stored the numerically determined desired incremental coarse step position, comparison means connected to said storer and coarse control means, operative to stop said coarse control means upon agreement between the stored numerically determined desired incremental step position and that representing the actual position of such part, and fine control means for effecting a fine step-by-step adjustment of such a part, a storer in which the number of the desired fine steps are stored, a digitizer operatively connected with said fine control means and responsive thereto, means connected with said second mentioned store and said digitizer for effecting a step-by-step comparison therebetween, and means connected to said last-mentioned comparison means responsive to agreement between said storer and said digitizer for stopping said fine control means.

2. A digital control according to claim 1 wherein the coarse control means brings the movable apparatus part so far as possible into its numerically determined desired position and the fine control means makes any additional correction which may be necessary.

3. A digital control according to claim 2, wherein the coarse control means sets the apparatus part on the higher-value decades of its numerically determined desired position and the fine control means controls the adjustment of at least the last decade.

4. A digital control according to claim 1, comprising a plurality of positioning motors for adjusting respective apparatus parts, and means operatively connecting said coarse control means with the respective motors, and means for operatively connecting said fine control means with said motors, said means for connecting the coarse control means to the respective motors being constructed to initially position all motors to the smallest desired value, following which the motor requiring the smallest desired value is rendered inoperative, and thereafter the remaining motors are controlled in common to position the same at the next larger desired value, and so on until all the motors have been positioned at their desired value.

5. A digital control according to claim 2, wherein, following coarse positioning of all motors, the respective positions are checked for fine adjustment by said fine control means, the connecting means for said fine control means operatively connects said fine control means to the respective motors for individual checking thereof.

References Cited

UNITED STATES PATENTS

| 3,020,460 | 2/1962 | Morin et al. | 318—28 |
| 3,063,311 | 11/1962 | Beckwith et al. | |
| 3,223,830 | 12/1965 | Evans | 318—28 XR |
| 3,323,030 | 5/1967 | Inaba et al. | 318—18 |
| 3,378,741 | 4/1968 | Sutton | 318—18 |
| 3,414,785 | 12/1968 | Orahood et al. | 318—18 |

BENJAMIN DOBECK, Primary Examiner

U.S. Cl. X.R.

318—28